United States Patent [19]

Krisher et al.

[11] Patent Number: 4,862,363
[45] Date of Patent: Aug. 29, 1989

[54] VOICE ACTUATED TWO SPEED AXLE

[75] Inventors: James A. Krisher, Fort Wayne, Ind.; Barry R. Lloyd, Ohio City, Ohio

[73] Assignee: Dana Corporation, Toledo, Ohio

[21] Appl. No.: 133,968

[22] Filed: Dec. 16, 1987

[51] Int. Cl.⁴ .......................... G10L 5/00; B60Q 5/00
[52] U.S. Cl. .................... 364/424.1; 364/424.05; 364/513.5; 381/42
[58] Field of Search ............ 364/513.5, 424.1, 424.05; 381/42, 43, 51; 74/867; 192/0.052

[56] References Cited

U.S. PATENT DOCUMENTS

| | | | |
|---|---|---|---|
| 4,401,852 | 8/1983 | Noso et al. | 381/43 X |
| 4,419,730 | 12/1983 | Ito et al. | 381/51 X |
| 4,441,385 | 4/1984 | Taga et al. | 74/867 |
| 4,450,545 | 5/1984 | Kishi et al. | 381/42 X |
| 4,501,012 | 2/1985 | Kishi et al. | 381/43 |
| 4,558,459 | 12/1985 | Noso et al. | 381/43 |
| 4,593,403 | 6/1986 | Kishi et al. | 381/43 |
| 4,718,525 | 1/1988 | Yamaguchi | 192/0.052 |
| 4,774,857 | 10/1988 | Heine et al. | 74/789 |

FOREIGN PATENT DOCUMENTS

| | | | |
|---|---|---|---|
| 58-114212 | 8/1983 | Japan | 381/42 |
| 59-102633 | 6/1984 | Japan | 364/513.5 |
| 59-117610 | 7/1984 | Japan | 381/42 |
| 60-59901 | 4/1985 | Japan | 381/42 |

Primary Examiner—Felix D. Gruber
Attorney, Agent, or Firm—MacMillan, Sobanski & Todd

[57] ABSTRACT

A vehicle two speed axle system can be voice-actuated by the vehicle operator. The two speed axle system includes a hydraulically actuated two speed axle unit having a solenoid-actuated control valve. A microphone is utilized to receive spoken commands from the operator which are recognized by a voice recognition and synthesis unit for controlling the system. A speaker is also provided for generating spoken messages representing conditions recognized by the system. The system includes a unique training program which is utilized initially to store voice template signals corresponding to the selected vocal instructions required to operate the system. The training program utilizes the voice synthesizer for prompting the operator through the training program.

12 Claims, 4 Drawing Sheets

STATE DIAGRAM DEFINITIONS

VOCAL ANNOUNCEMENT THROUGH SPEAKER

NO VOICE ANNOUNCEMENT

VOCAL INSTRUCTIONS BY OPERATOR WHICH CAUSES SYSTEM TO CHANGE STATES

NON-VOCAL RESPONSE BY OPERATOR OR SENSOR INPUT WHICH CAUSES SYSTEM TO CHANGE STATES

DECISION POINT

VOICE ACTUATED TWO SPEED AXLE

BACKGROUND OF THE INVENTION

The present invention relates generally to a vehicle two speed axle and, in particular, to a vehicle two speed axle which can be vocally operated by the driver.

In recent years, numerous voice actuated control systems have been proposed for use with vehicles. For example, U.S. Pat. No. 4,450,545 discloses a voice responsive door lock system wherein the door lock device is vocally controlled by the driver via a voice recognition unit. The system recognizes an unlocked door and initiates a question as to the necessity for locking the door. The voice recognition unit identifies the driver's reply and produces a door lock command signal for actuating the door lock device.

U.S. Pat. No. 4,501,012 discloses a voice actuated system for vehicles for controlling the on/off condition of the radio or air conditioner, and controlling the high/low beam status of the headlights.

U.S. Pat. No. 4,419,730 discloses a voice actuated system for controlling the temperature setting of a vehicle air conditioning system.

SUMMARY OF THE INVENTION

The present invention concerns a unique vehicle two speed axle system which can be voice-actuated by the vehicle operator. The two speed axle system includes a hydraulically actuated two speed axle unit having a solenoid-actuated control valve. A microphone is responsive to spoken commands from the operator which are recognized by a voice recognition and synthesis unit for controlling the system. A speaker is also provided for generating spoken messages representing conditions recognized by the system. The system includes a unique training program which is utilized initially to store voice template signals corresponding to the selected vocal instructions required to operate the system. The training program utilizes the voice synthesizer for prompting the operator through the training program.

DESCRIPTION OF THE PREFERRED EMBODIMENT

Figure 1:
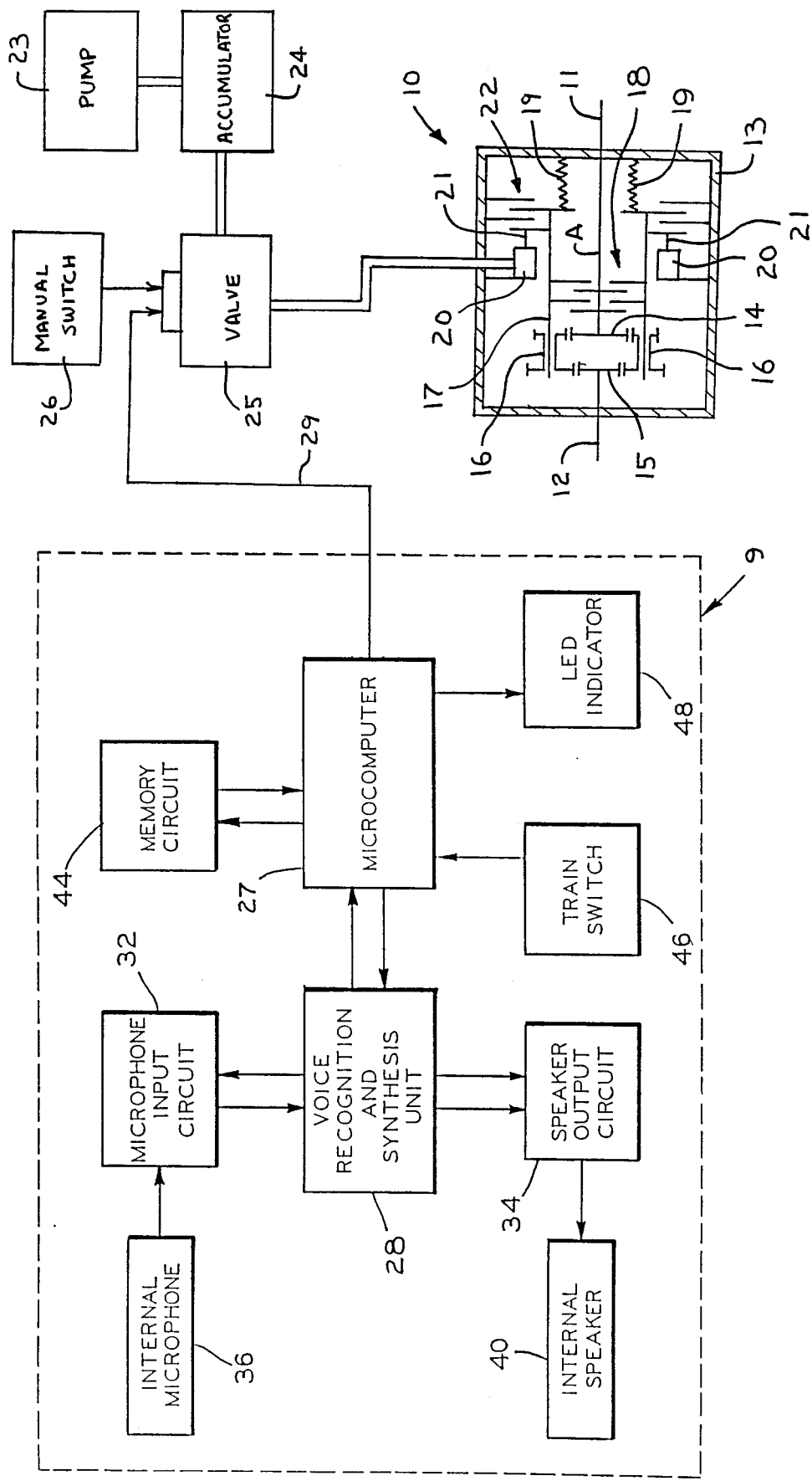
FIG. 1 is a block diagram of a voice actuated two speed system according to the present invention.

Referring now to the drawings, and particularly to FIG. 1, there is shown in block diagram form a voice actuated control system 9 for controlling the shifting of a schematically shown two speed axle assembly 10. It should be noted that the two speed axle assembly 10 as herein described is only one embodiment with which the present invention can be used. For example, the present invention can be used in any situation wherein it is desirable to shift a vehicle transmission.

The two speed axle assembly 10 may include either direct and overdrive modes or direct and under drive modes depending upon the particular gear ratios provided. The embodiment illustrated and described herein includes direct and overdrive modes. However it will be understood that by provision of suitable gears the device might as well provide direct and under drive modes. Rotary drive from the vehicle engine is supplied to the two speed axle assembly 10 through an input or drive shaft 11. The two speed axle assembly has an output shaft 12 by which rotary power in either the direct or the overdrive mode is transmitted to a differential (not shown) for driving the vehicle's drive wheels in the conventional manner.

The two speed axle assembly 10 includes a generally cylindrical carrier case 13 within which the input shaft 11 and the output shaft 12 are rotatably supported in axial alignment about a common axis A. The inner end of the input shaft 11 has an input sun gear 14 fixed thereto and the output shaft has an output sun gear 15 secured at its inner end adjacent the sun gear 14. A plurality of compound planet gears 16, in this case four such gears, are equally spaced around the sun gears and are rotatably supported by means of a planet carrier 17. The compound planet gears are mounted for rotation about their respective axes in intermeshed relationship with the sun gears 14 and 15, while the planet carrier 17 is likewise mounted for rotation about the axis A while carrying the compound planet gears intermeshed with the sun gears.

As illustrated schematically in FIG. 1 a direct drive clutch pack 18, loaded by compression springs 19, locks the planet carrier 17 to the input sun gear 14. The planet carrier thus normally rotates with the input shaft 11 and the input sun gear 14, causing the compound planet gears 16 to be locked to the input sun gear and consequently rotating the output sun gear 15 so that the two speed axle assembly operates in the direct drive mode. In order to shift from the direct drive mode to the overdrive mode an expandable bladder 20 is hydraulically inflated to displace a bladder piston 21 which simultaneously loads an overdrive clutch pack 22 and retracts the compression springs 19 to unload the direct drive clutch pack 18. Loading of the overdrive clutch pack 22 locks the planet carrier 17 to the carrier case 13 so that the planet gears 16 are rotated about their axes by the input sun gear 14 and they, in turn, rotate the output sun gear 15 with the axle assembly in the overdrive mode.

The hydraulic system employed in inflating the bladder 20 utilizes a hydraulic pump 23 which can be the power steering pump of the vehicle. The pump 23 maintains a minimum pressure in an accumulator 24, and flow of pressurized fluid from the accumulator is controlled by a solenoid actuated valve 25 to selectively pressurize the bladder for shifting from the direct to the overdrive mode. Upon release of the hydraulic pressure, the springs 19 extend to retract the bladder piston 21, collapsing the bladder 20 and loading the clutch pack 18 so that the axle assembly reverts to the direct drive mode. Utilizing the pump to maintain a minimum pressure in the accumulator to provide for periodic inflation of the bladder permits intermittent operation of the pump and avoids the necessity for cooling of the hydraulic fluid. The valve 25 can be actuated by the operator by utilizing either a manual switch 26, or the voice actuated control system.

The voice actuated control system 9 will now be discussed in detail. The system 9 is controlled by a microcomputer 27 which is connected to a voice control means such as a voice recognition and synthesis unit 28. The microcomputer 27 is connected to generate a valve control signal on a line 29.

The voice recognition and synthesis unit 28 is connected to a microphone input circuit 32 and a speaker output circuit 34. The input circuit 32 is connected to a microphone 36, while the output circuit 34 is connected to a speaker 40. The microcomputer 27 is also connected to a memory circuit 44, a train switch 46, and an LED indicator 48.

The voice recognition and synthesis unit 28 receives vocal instructions from an authorized person such as the vehicle operator. The vocal instructions are detected by the microphone 36 and are generated as an input signal to the microphone input circuit 32. The input circuit 32 can include means for providing the desired filtering of the input signal, for controlling the gain to the input signal, and for converting the analog input signal into a digital form prior to supplying the input signal to the voice recognition and synthesis unit 28. The voice recognition and synthesis unit 28 can also send control signals to the microphone circuit 32.

The operation of the voice recognition and synthesis unit 28 is controlled by the microcomputer 27 which is connected to generate the required valve actuation signal on the line 29. The microcomputer 27 is also connected to the memory circuit 44 which is adapted to store the associated voice recognition templates and speech synthesis data. The voice recognition and synthesis unit 28 provides a digital audio output signal to the speaker output circuit 34 which converts the digital output signal to analog form, provides the desired filtering of the signal, and supplies the analog output signal to the speaker 40. As will be discussed, the speaker 40 generates vocal announcements to inform the operator of the present operating status of the system. The voice control means 28 can be a SP1000 voice recognition/synthesis circuit and the microcomputer 27 can be a VRS1000 microcomputer, both available from General Instrument Corporation.

The microcomputer 27 is connected to a train switch 46 and an LED indicator 48. As will be discussed, the train switch 46 is utilized by the operator to initiate a unique training program wherein selected voice recognition templates are stored in the memory 44. The LED indicator 48 can be used to provide the operator with a visual indication that the system is awaiting a vocal instruction or other command from the operator.

The microcomputer 27 functions to analyze the incoming vocal instructions from the vehicle operator and, if the received instruction corresponds to a selected one of the of the voice recognition templates, generates a selected one of a plurality of separate control signals to the voice recognition and synthesis unit 28, and/or a control signal required to shift the two speed axle unit. In order to avoid undesirable erroneous operation of the two speed axle system as a result of extraneous noise, the voice control unit must receive at least two separate vocal instructions in a predetermined order and within a predetermined time period prior to generating any one of the control signals.

Figure 2:
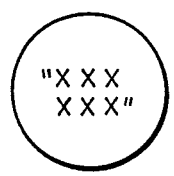
FIG. 2 is a diagram which defines the symbols utilized in the state diagrams of FIGS. 3a and 3b.
Figure 2:
Figure 2:
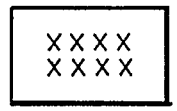
Figure 2:
Figure 2:
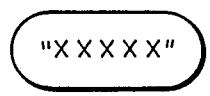
Figure 2:
Figure 2:
Figure 2:
Figure 2:
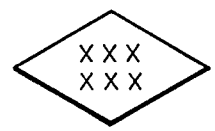
Figure 2:
Figure 2:

The operation of the voice control unit will now be discussed in detail with reference to FIGS. 2 and 3a and 3b. In FIG. 2, there is shown a diagram which defines the symbols utilized in the state diagrams of FIGS. 3a and 3b. As shown in FIG. 2, a circle with a statement in quotes ("xxxxxx") represents a state which, when entered, provides the vehicle operator with a vocal announcement through the speaker 40. A rectangular box indicates a state which, when entered, does not provide a verbal response to the operator. An oval, wherein the written portion therein is contained within quotes ("xxxxx"), represents a vocal instruction by the operator which causes the system to change states. However, an oval wherein the wording therein is not in quotes, represents a non-vocal command by an operator such as, for example, the actuation of the train switch 46 which causes the system to change states. Finally, a diamond-shaped box represents a decision point in the program wherein, depending on the particular operating conditions, the microcomputer 27 causes the system to be routed to a selected one of several different states.

Figure 3A:
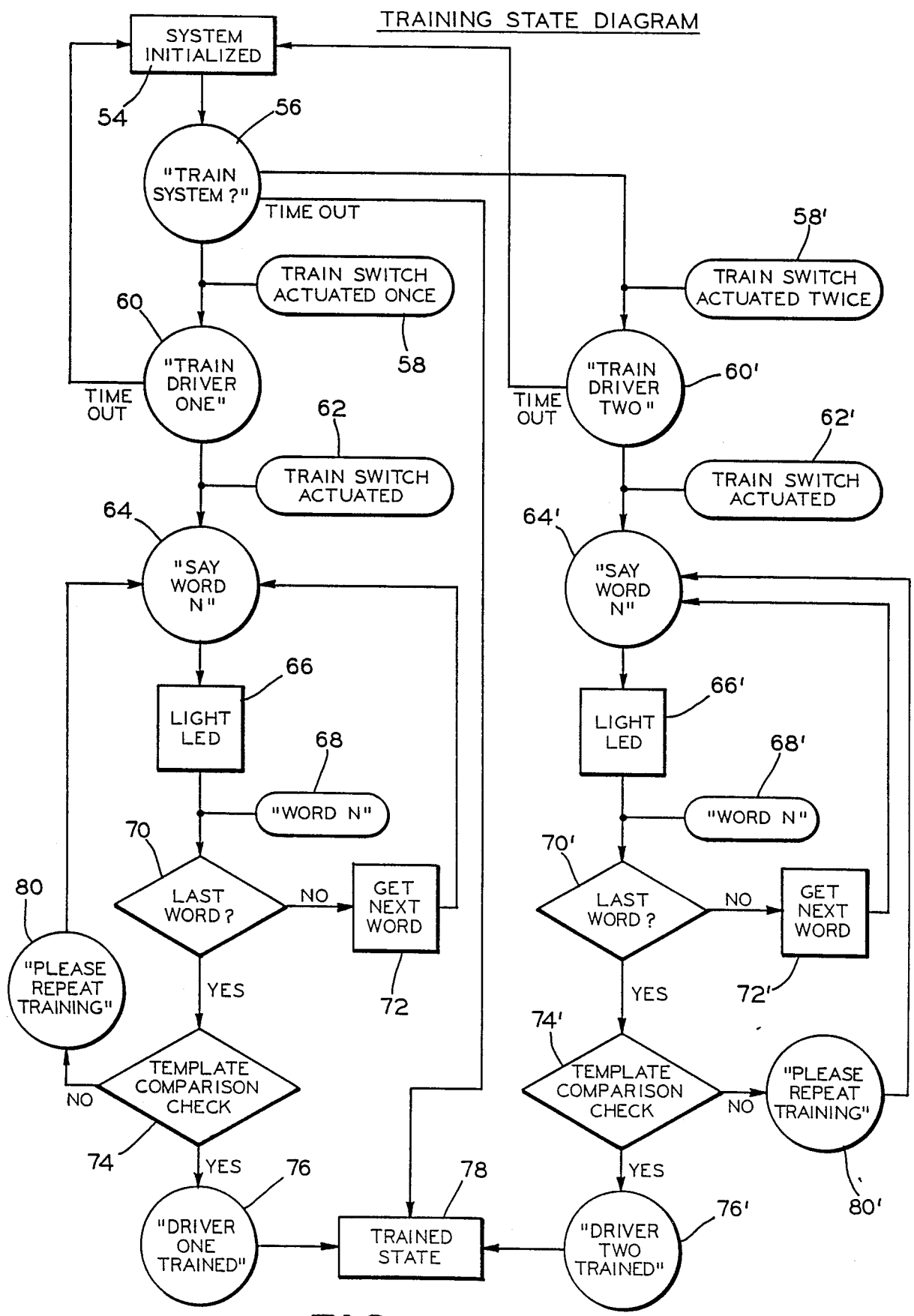
FIGS. 3a and 3b are state diagrams which illustrate the operation of the present invention.

Referring now to FIG. 3a, there is shown a state diagram of the training program which must be performed by the vehicle operator prior to utilizing the voice control unit. The training program instructs the operator to repeat the plurality of instruction phrases which are required to operate the two speed axle shift system. In the preferred embodiment of the invention, the vocal instructions required to operate the system include the phrases "SHIFT UP", and "SHIFT DOWN". As these phrases are spoken by the vehicle operator during the training program, the voice templates generated thereby are stored in the associated memory circuit 44. During the operation of the voice control unit, a vocal instruction received from the operator is converted to a voice template which is subsequently compared to the each of the stored templates to determine which one, if any, corresponds to the template of the received instruction. Upon recognizing correspondence, the appropriate control signal is generated by the microcomputer 27.

The training program of FIG. 3a is initiated at a state 54 wherein the system has been turned on and initialized. The program asks the operator "TRAIN SYSTEM?" at state 56. At this point, in order to proceed through the training program, the vehicle operator momentarily actuates the train switch 46 at instruction 58. This causes the program to enter a state 60 wherein the voice control unit responds to the operator with the phrase "TRAIN DRIVER 1". At this time, the operator must again momentarily actuate the train switch at 62 to cause the system to enter the next state. If the train switch is not actuated again within a predetermined time period, the system times out and returns to the system initialized state 54. However, once the train switch has been actuated the second time, the program enters a state 64 wherein the voice control unit responds with the phrase "SAY WORD N" where "N" represents one of a plurality of operator vocal instructions which must be stored prior to operation of the system. It should be noted that the training program could be designed to enable the driver to choose his own command phrases, particularly the command phrases necessary to disarm the system.

Once the voice control unit has instructed the driver to say a specific word or phrase, the program enters a state 66 wherein the LED indicator 48 is lit. This provides the driver with an indication that the voice control unit is awaiting a response from the driver. At this time, the driver says the word or phrase at 68 as requested by the system. If the word or phrase is not spoken within a particular time period, the program times out to the state wherein the instruction is again given to the operator. Once the driver has spoken the requested word, a voice template representing the spoken word or phrase is stored in the memory circuit 44. The program then enters a decision point 70 to check whether all the required voice templates have been stored by the microcomputer. If the answer is "NO", the program branches to a state 72 wherein the microcomputer retrieves the next word which is to be spoken by the operator by returning to the state 64.

Once all the required voice templates have been stored, the program branches from 70 at "YES" and enters a decision point 74 wherein a comparison is made between all the individual voice templates which have been stored during the training program. If the stored templates are not sufficiently different from one another, this indicates that there may be a problem in the recognition of a particular vocal instruction and the program branches at "NO". Consequently, it is desirable to request the operator to repeat the training sequence at state 80 and the program returns to state 64.

If the stored templates are sufficiently different, the program branches from state 74 at "YES" and a vocal response "DRIVER ONE TRAINED" at 76 is generated before the trained state 78 is entered. Also, if the system has been trained, the operator need only wait at state 56. If the train switch is not actuated, the program will time out and proceed directly to the trained state 78.

The present system can be utilized to train more than one driver. In the event it is desired to train a second driver, the second driver responds to the question "TRAIN SYSTEM?" at 56 by momentarily actuating the train switch 46 twice at 58'. The program then proceeds through a sequence which is similar to the sequence in training the first driver with similar states identified with primed numbers. It should be noted that the system could readily be adapted to train more than two drivers or operators.

Once the system is in the trained state, selected vocal instructions from the vehicle operator corresponding to the stored voice templates can be utilized to control the two speed axle system. Referring to FIG. 3b, there is shown the vocal instructions and the associated system responses required to cause the microcomputer 27 to generate either the SHIFT UP signal or the SHIFT DOWN signal to the speed control unit. As shown in FIG. 3b, once the system is in the trained state 78, a vocal instruction "SHIFT UP" 81 by the operator causes the system to enter a state 82 wherein the microcomputer checks the present gear status of the axle unit. If the unit is in high gear, the system enters a state 84 wherein the voice control unit responds with the phrase "SYSTEM IN HIGH", before returning to the trained state 78. If the unit is in low gear, the system enters a state 86 wherein the voice control unit responds with the phrase "READY TO SHIFT UP". At this time, in order for the voice control unit 12 to generate the SHIFT UP signal, the operator must again respond with the phrase "SHIFT UP" at 88 within a predetermined time period. If the operator responds with a "NO" at 90, the system returns to the trained state 78. Also, if the operator does not respond with the command "SHIFT UP" within a predetermined time period, the system times out to the trained state condition.

If, however, the operator responds with the second command "SHIFT UP" within the allotted time period, the system enters a state 92 and responds with the phrase "SHIFTING UP" and then enters a state 94 wherein the microcomputer generates the SHIFT UP signal to the axle unit and cancels any other previous control signal.

Figure 3B:
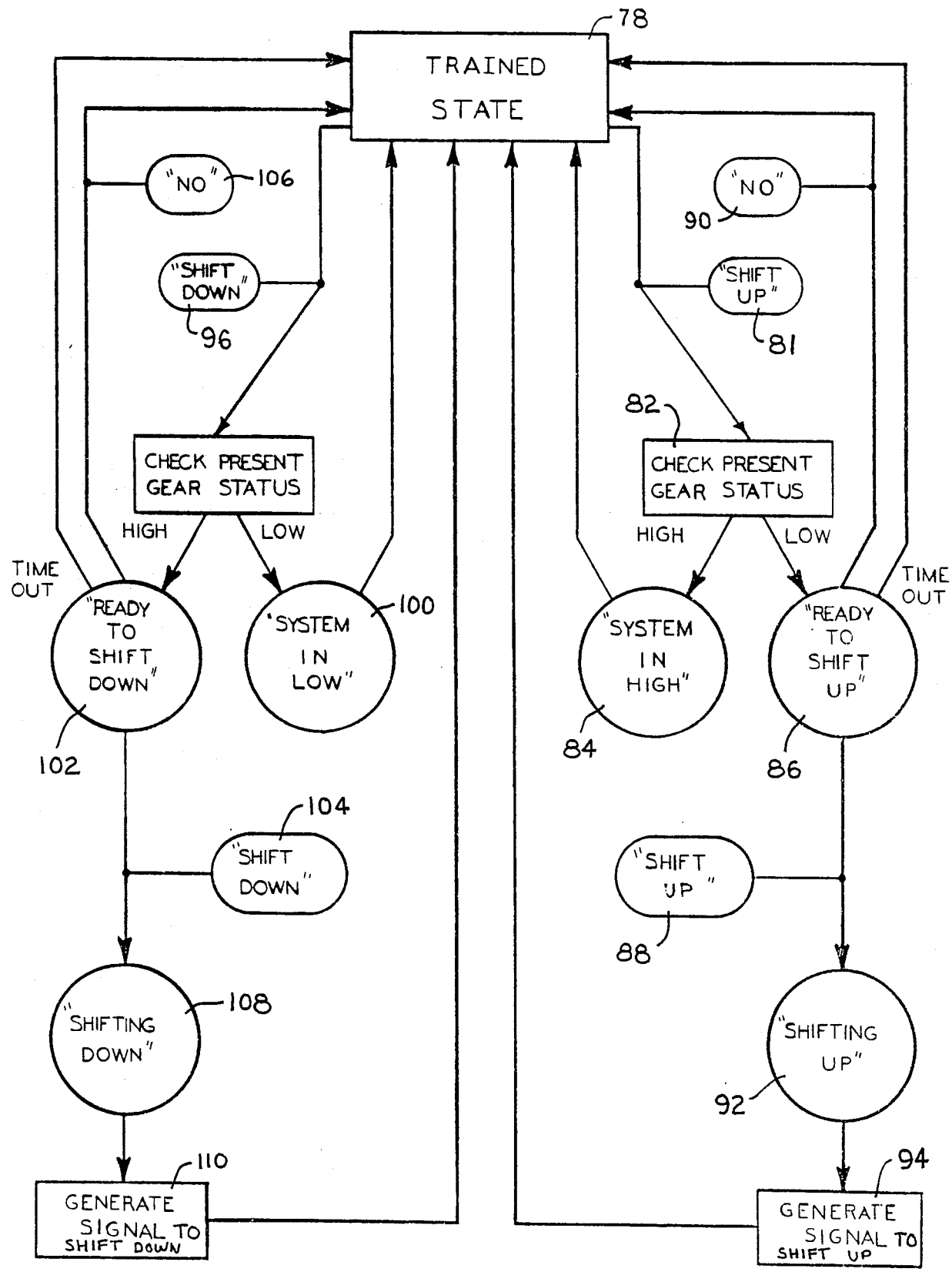

As shown in FIG. 3b, once the system is in the trained state, a vocal instruction "SHIFT DOWN" 96 by the operator causes the system to enter a state 98 wherein the microcomputer checks the present gear status of the axle unit. If the unit is in low gear, the system enters a state 100 wherein the voice control unit responds with the phrase "SYSTEM IN LOW", before returning to the trained state 78. If the unit is in high gear, the system enters a state 102 wherein the voice control unit responds with the phrase "READY TO SHIFT DOWN". At this time, in order to cause the voice control unit to generate the SHIFT DOWN signal to the two speed axle unit, the operator must respond with the phrase "SHIFT DOWN" at 104 within a predetermined time period. If the operator responds with a "NO" at 106, the system returns to the trained state 78. Also, if the operator does not respond with the command "SHIFT DOWN" within a predetermined time period, the system times out to the trained state condition.

If, however, the operator responds with the second command "SHIFT DOWN" within the allotted time period, the system enters a state 108 and responds with the phrase "SHIFTING DOWN" and then enters a state 110 wherein the microcomputer generates the SHIFT DOWN signal to the axle unit and cancels any other previous control signals.

In accordance with the provisions of the patent statutes, the present invention has been described in what is considered to represent its preferred embodiment. However, it should be noted that the invention can be practiced otherwise than as specifically illustrated and described without departing the scope of the attached claims.

What is claimed is:

1. An apparatus for controlling the gear ratio of an engine-driven vehicle, comprising:
   transmission means having a shifting means for shifting said transmission between a first gear ratio and a second higher gear ratio;
   a voice recognizing means for recognizing vocal commands and delivering an upshift command signal in response to an upshift vocal command and a downshift command signal in response to a downshift vocal command; and
   an actuation means being operatively connected to actuate said shifting means, said actuation means being responsive to said upshift command signal to operate said shifting means to shift said transmission means from said first gear ratio to said second gear ratio and responsive to said downshift command signal to operate said shifting means to shift said transmission from said second gear ratio to said first gear ratio.

2. The apparatus according to claim 1 including voice synthesis means responsive to said upshift and downshift vocal commands for generating a vocal announcement to the vehicle operator confirming that said upshift and downshift vocal commands have been received by said voice recognizing means.

3. The apparatus according to claim 1 wherein one of said upshift and downshift vocal commands is a first vocal command and said voice recognizing means is responsive to a second vocal command from the vehicle operator for generating a respective one of said upshift and downshift command signals only when said second vocal command is received by said voice recognizing means within a predetermined time after said first vocal command is received.

4. The apparatus according to claim 3 including voice synthesis means responsive to said first vocal command for generating a first vocal announcement confirming that said first vocal command has been received by said voice recognizing means and responsive to said second vocal command for generating a second vocal announcement indicating that the respective one of said upshift and downshift command signals has been supplied to said actuation means.

5. The apparatus according to claim 4 wherein said voice recognizing means is responsive to a third vocal command from the vehicle operator for preventing the respective one of said upshift and downshift command signals from being generated unless said first vocal command is again received from the vehicle operator and is followed by said second vocal command within said predetermined time period.

6. The apparatus according to claim 1 wherein said first and second vocal commands are different from on another.

7. An apparatus for controlling the gear ratio of an engine-driven vehicle, comprising:
   transmission means having a fluid-actuated shifting means for shifting said transmission between a first gear ratio and a second higher gear ratio;
   a voice recognizing means for recognizing vocal commands and delivering an upshift command signal in response to an upshift vocal command and a downshift command in response to a downshift vocal command;
   a supply of pressurized fluid;
   valve means operatively connected between said fluid supply and said fluid-actuated shifting means;
   said valve means being responsive to said upshift command signal to actuate said shifting means to shift said transmission means from said first gear ratio to said second gear ratio and responsive to said downshift command signal to operate said shifting means to shift said transmission from said second gear ratio to said first gear ratio.

8. The apparatus according to claim 7 including voice synthesis means responsive to said upshift and downshift vocal commands for generating a vocal announcement to the vehicle operator confirming that said upshift and downshift vocal commands have been received by said voice recognizing means.

9. The apparatus according to claim 8 including voice synthesis means responsive to said first vocal command for generating a first vocal announcement confirming that said first vocal command has been received by said voice recognizing means and responsive to said second vocal command for generating a second vocal announcement indicating that the respective one of said upshift and downshift command signals has been supplied to said actuation means.

10. The apparatus according to claim 7 wherein one of said upshift and downshift vocal commands is a first vocal command and said voice recognizing means is responsive to a second vocal command from the vehicle operator for generating a respective one of said upshift and downshift command signals only when said second vocal command is received by said voice recognizing means within a predetermined time after said first vocal command is received.

11. The apparatus according to claim 10 wherein said voice recognizing means is responsive to a third vocal command from the vehicle operator for preventing the respective one of said upshift and downshift command signals from being generated unless said first vocal command is again received from the vehicle operator and is followed by said second vocal command within said predetermined time period.

12. The apparatus according to claim 7 wherein said first and second vocal commands are different from one another.

* * * * *